United States Patent
Rogers et al.

(10) Patent No.: US 7,037,568 B1
(45) Date of Patent: May 2, 2006

(54) JOINING MEMBER FOR MECHANICALLY JOINING A SKIN TO A SUPPORTING RIB

(76) Inventors: Terry W. Rogers, 9702 Allison Cir., Huntington Beach, CA (US) 92646; Ward M. Olson, 2812 Via Barri, Palos Verdes Estates, CA (US) 90274

( * ) Notice: Subject to any disclaimer, the term of this patent is extended or adjusted under 35 U.S.C. 154(b) by 0 days.

(21) Appl. No.: 10/619,871

(22) Filed: Jul. 15, 2003

(51) Int. Cl.
  *B32B 3/06* (2006.01)
(52) U.S. Cl. ............... 428/119; 428/156; 428/167; 244/123; 244/131; 52/729.1
(58) Field of Classification Search ........... 428/119, 428/120, 156, 167; 244/123, 131; 52/729.2; 403/265
See application file for complete search history.

(56) References Cited

U.S. PATENT DOCUMENTS

| | | | |
|---|---|---|---|
| 1,453,114 A | 4/1923 | Rapp et al. | |
| 2,218,122 A | 10/1940 | Scheller et al. | |
| 3,096,958 A | 7/1963 | Koontz | |
| 3,920,206 A | 11/1975 | Bigham et al. | |
| 4,535,958 A | 8/1985 | Hutchinson | |
| 4,766,020 A * | 8/1988 | Ellingson, Jr. | 428/54 |
| 4,952,434 A * | 8/1990 | Rumsey et al. | 428/54 |
| 5,134,812 A * | 8/1992 | Hoffman et al. | 52/1 |
| 5,273,806 A | 12/1993 | Lockshaw et al. | |
| 5,487,930 A | 1/1996 | Lockshaw et al. | |
| 5,508,085 A | 4/1996 | Lockshaw et al. | |
| 5,580,622 A | 12/1996 | Lockshaw et al. | |
| 5,616,376 A | 4/1997 | Lockshaw et al. | |
| 5,633,053 A | 5/1997 | Lockshaw et al. | |
| 5,849,393 A | 12/1998 | Slattery | |
| 5,928,756 A * | 7/1999 | Davis et al. | 428/122 |
| 5,944,286 A | 8/1999 | Morris et al. | |
| 6,375,120 B1 | 4/2002 | Wolnek | |
| 6,513,757 B1 | 2/2003 | Amaoka et al. | |
| 6,520,706 B1 * | 2/2003 | McKague et al. | 403/265 |

* cited by examiner

*Primary Examiner*—Alexander S. Thomas
(74) *Attorney, Agent, or Firm*—Eric Karich

(57) ABSTRACT

A joining member for mechanically joining a skin to a supporting rib has a first surface and a second surface opposite the first surface. The first surface is adapted for bonding to a surface of the skin via a layer of a first adhesive material. The second surface includes a groove having an inner surface adapted for receiving and bonding to an outer edge of the rib via a layer of a second adhesive material. The joining member enables a novel method of construction having advantages over the prior art.

4 Claims, 9 Drawing Sheets

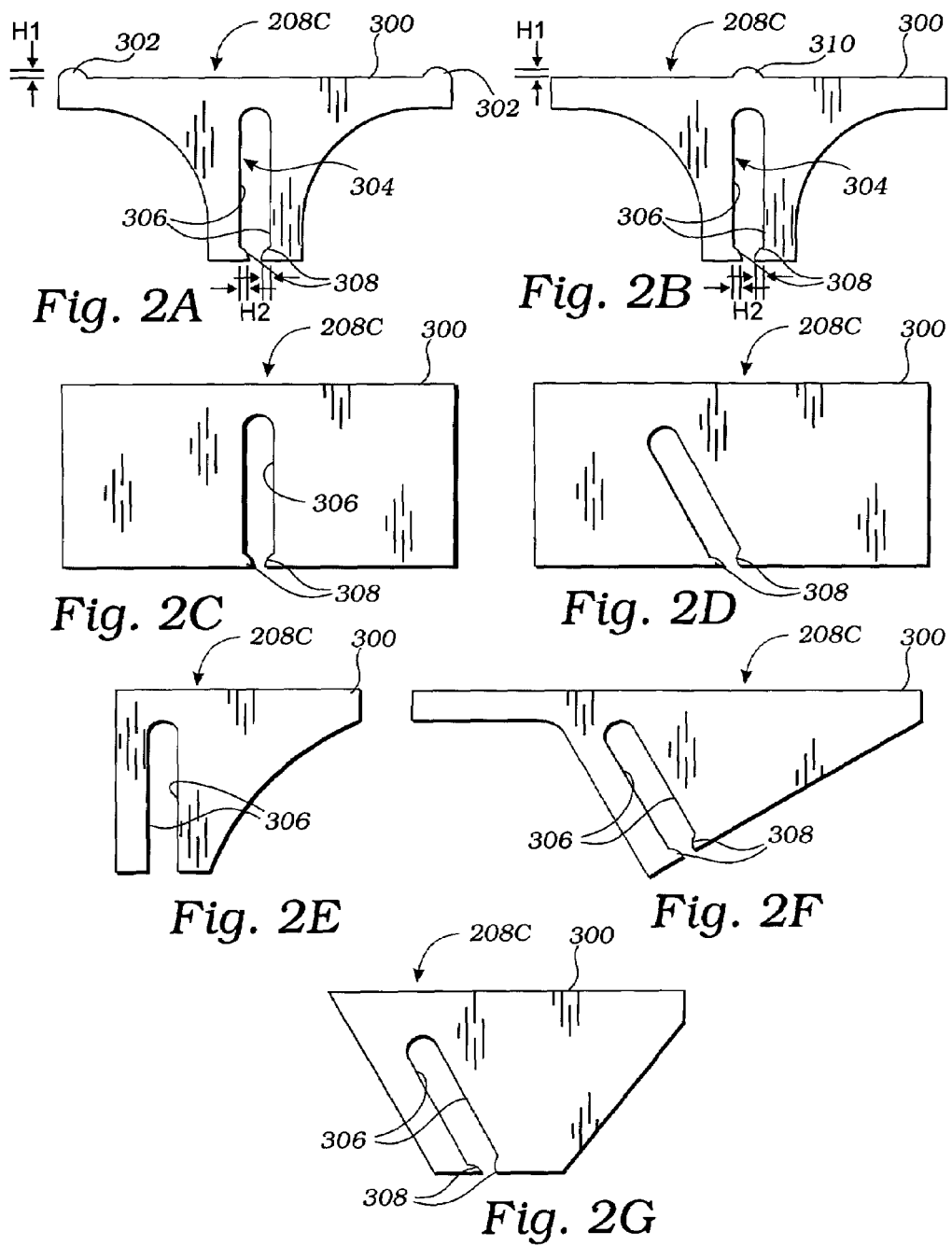

JOINING MEMBER FOR MECHANICALLY JOINING A SKIN TO A SUPPORTING RIB

BACKGROUND OF THE INVENTION

1. Field of the Invention

This invention relates generally to structural members, and more particularly to a joining member for mechanically joining a skin to a supporting rib.

2. Description of Related Art

Structural elements for supporting a skin with a rib are known in the art, particularly in the field of aircraft construction, but also in other fields. For example, U.S. Pat. No. 2,218,122 to Scheller et al. describes a structural member for supporting opposing skins of an airplane control element (e.g., wing). The structural member includes one or more web sections riveted between flange scarfs. Each flange scarf includes either a "T"-shaped, two "L"-shaped, or a "U"-shaped rod. Surfaces of the flange scarfs opposite the web sections extend in parallel to the wing covering.

Construction of such structural members is difficult and therefore labor intensive. For example, corresponding holes must be drilled in the central web sections and in the flange scarfs to receive the rivets. For structural integrity, the rivets must fit snugly in the aligned holes. This means the holes must be aligned precisely to receive the rivets. Such precise alignment is difficult to achieve, and takes a substantial amount of time even when possible. Further, structural stresses are concentrated around the rivets.

Other examples of such constructions are shown in Lockshaw et al., U.S. Pat. No. 5,273,806, which teaches a structural element of an aircraft. The structural element includes opposed first and second, laterally and longitudinally extended, generally planar surface structures each having a closed figure pattern of ribbing projecting therefrom toward the opposite surface structure. The ribbing is of respective heights to bridge the space between the surface structures, the opposed ribbing being interlocked in a registered, mating relation. Similar structures are also shown in other Lockshaw patents, including U.S. Pat. Nos. 5,633,053, 5,508,085, 5,273,806, and 5,616,376.

Lockshaw et al., U.S. Pat. No. 5,580,622, teaches a structural element suitable for walls, tanks and bulkhead structures. The structural element includes opposed, axially extended surface structures and ribbing interposed therebetween. The ribbing is integral with one of the surface structures, and fits into a groove that is integral with the other of the surface structures. This arrangement allows the surface structures to be in a freely movable relation responsive to a temporary first relative dimensional condition of the surface structures and ribbing, and in blocking relation against separation of the surface structures responsive to a persistent second relative dimensional condition of the surface structures and ribbing.

The above-described references, incorporated herein by reference, show the use of ribs that are integral with one of the surface structures. The references also teach the engagement of a rib with a groove that is integrally formed in one of the surface structures. However, the prior art does not teach a joining member that is not integral with the surface structure, but is bonded or otherwise attached to the surface structure, and which provides the groove to engage the rib.

SUMMARY OF THE INVENTION

The present invention teaches certain benefits in construction and use which give rise to the objectives described below.

The present invention provides a joining member for mechanically joining a skin to a supporting rib. The joining member includes a first surface and a second surface opposite the first surface. The first surface is adapted for bonding to a surface of the skin via a layer of a first adhesive material. The second surface includes a groove having an inner surface adapted for receiving and bonding to an outer edge of the rib via a layer of a second adhesive material. The joining member enables a novel method of construction having advantages over the prior art.

A primary objective of the present invention is to provide a joining member having advantages not taught by the prior art.

Another objective is to provide a joining member for mechanically joining a skin to a supporting rib using a method that is faster, easier, less expensive, and more reliable than prior art methods.

A further objective is to provide a method for mechanically joining a skin to a supporting rib in a manner that reduces the risk of separation.

Other features and advantages of the present invention will become apparent from the following more detailed description, taken in conjunction with the accompanying drawings, which illustrate, by way of example, the principles of the invention.

BRIEF DESCRIPTION OF THE DRAWING

The accompanying drawings illustrate the present invention. In such drawings:

FIGS. 2A–2G are cross-sectional views of various alternative embodiments of the joining member;

DETAILED DESCRIPTION OF THE INVENTION

Figure 1:
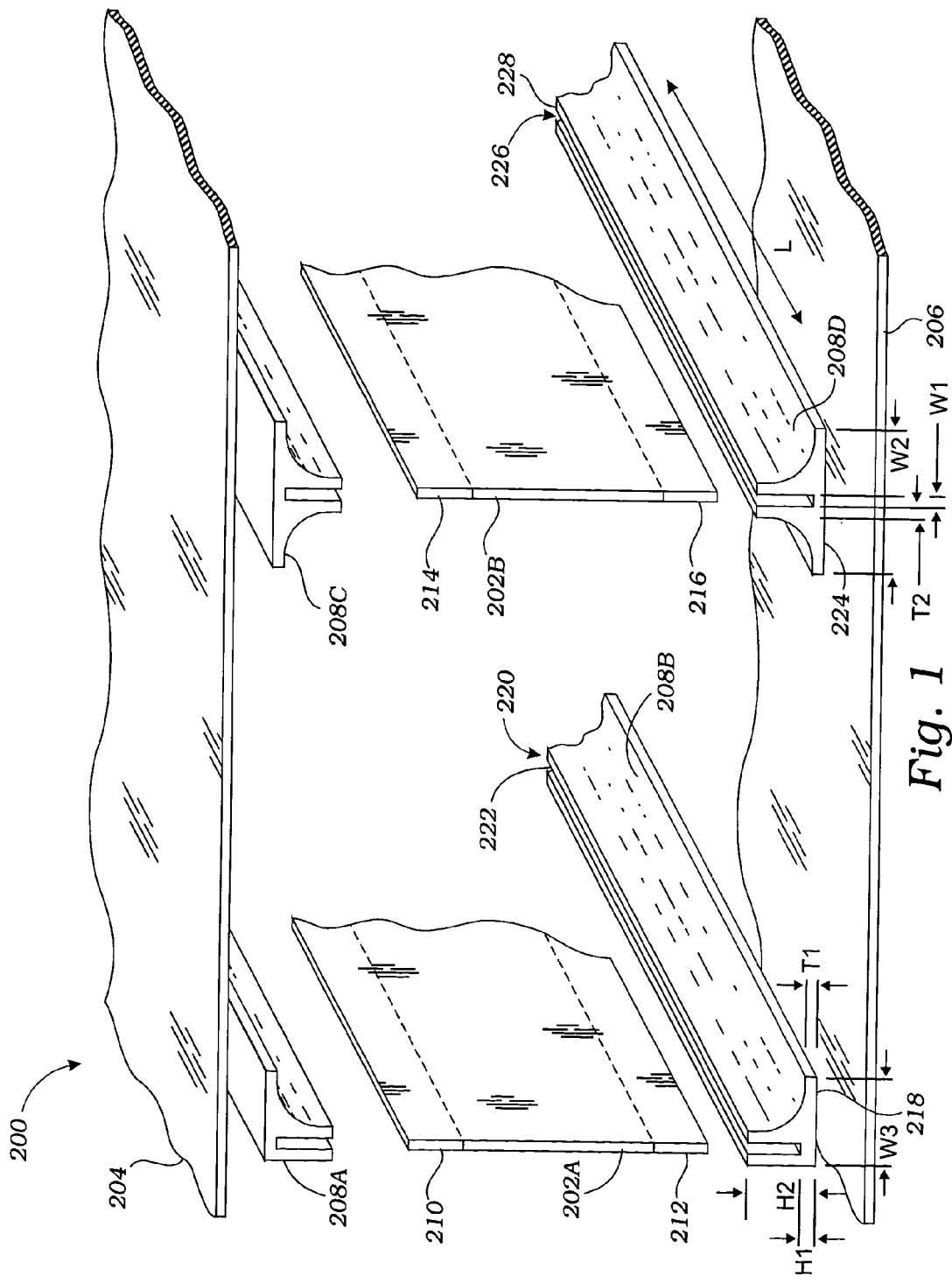
FIG. 1 is an exploded perspective view of a section of a structural element illustrating how joining members are used to connect a rib to upper and lower skins.

FIG. 1 is an exploded perspective view of a section 200 of a structural element illustrating relative positions of several components. The structural element may be any structure that includes a skin that is or may be supported by a rib, including a variety of walls, tanks, airfoils, bulkheads, ramps, or other structural elements. Since the particular application of this technology is not important, the application should not be limited the construction of the below-described claims.

As shown in FIG. 1, in the section 200, ribs 202A and 202B are adapted for supporting an upper skin 204 and a lower skin 206 are shown positioned between the upper skin 204 and the lower skin 206. A joining member 208A is positioned between an upper edge 210 of the rib 202A and the upper skin 204, and is used to connect the upper edge 210 of the rib 202A to the upper skin 204. A joining member 208B is positioned between a lower edge 212 of the rib 202A and the lower skin 206, and is used to connect the lower edge 212 of the rib 202A to the lower skin 206.

Similarly, a joining member 208C is positioned between an upper edge 214 of the rib 202B and the upper skin 204, and is used to connect the upper edge 214 of the rib 202B to the upper skin 204. A joining member 208D is positioned between a lower edge 216 of the rib 202B and the lower skin 206, and is used to connect the lower edge 216 of the rib 202B to the lower skin 206.

In general, and as described in more detail below, each of the joining members 208 has a first surface adapted for attaching to a surface of a skin of the structure (i.e., an adjacent surface of either the upper skin 204 or the lower skin 206) via an adhesive layer, and a groove in a second surface opposite the first surface is adapted for receiving an edge of a corresponding rib. An inner surface of the groove is adapted for attaching to the edge of the corresponding rib via another adhesive layer.

For example, the joining member 208B has a first surface 218 positioned adjacent to the lower skin 206, and a groove 220 in a second surface 222 opposite the first surface. The surface 218 of the joining member 208B is adapted for attaching to an adjacent surface of the lower skin 206 via an adhesive layer, and the groove 220 in the surface 222 opposite the surface 218 is adapted for receiving the lower edge 212 of the corresponding rib 202A. An inner surface of the groove 220 is adapted for attaching to the lower edge 212 of the corresponding rib 202A via another adhesive layer.

Similarly, the joining member 208D has a first surface 224 positioned adjacent to the lower skin 206, and a groove 226 in a second surface 228 opposite the first surface. The surface 224 is adapted for attaching to an adjacent surface of the lower skin 206 via an adhesive layer, and the groove 226 in the surface 228 is adapted for receiving the lower edge 216 of the corresponding rib 202B. An inner surface of the groove 226 is adapted for attaching to the lower edge 216 of the corresponding rib 202B via another adhesive layer.

The joining members 208C–208D have longitudinal axes "L." The joining members 208C and 208D have flanges extending outwardly from either side if a centerline—a central portion extending along the longitudinal axes. On the other hand, the joining members 208A and 208B each have a single flange extending from one side of a centerline. The joining members 208A and 208B are "end" joining members expectedly positioned at an abrupt end of the structural element.

The ribs 202A and 202B, the skins 204 and 206, and the joining members 208A–208D may be formed from any metallic, composite, or other material suitable for the structural element. For example, some suitable metallic materials include aluminum and titanium, and their alloys. Suitable aluminum alloys include 2024 (AMS4036, 4037, 4041), 6061 (AMS4023, 4026, 4027), 7075 (AMS4045, 4046, 4049, 4078), and 7050 (AMS4050). Suitable titanium alloys include 6-4 (MIL-T-9046 and MIL-T-9047). Suitable composite materials include graphite/epoxy laminate, s-glass/epoxy laminate, and aramid (aromatic polyamide) fiber/epoxy laminate. A suitable aramid fiber is sold by the DuPont Company (Wilmington, Del.) under the Kevlar® brand name. While some of the materials suitable for the present invention are described herein, this should in no way limited the scope of the present invention, which can be adapted by those skilled in the art to a wide variety of materials depending upon the nature of the structural element.

In one embodiment, the skins 204 and 206 may be formed from, for example, aluminum alloy sheet having a thickness of 0.050 inch. The ribs 202A and 202B may be formed from, for example, aluminum alloy sheet having a thickness of 0.030 inch. Flanges of the joining members 208A–208D have a thickness "T1." The thickness T1 may be, for example, 0.030 inch. The joining members 208A–208D may be formed by extrusion or pull-trusion, or may be compression molded. The grooves in the joining members 208A–208D have a width "W1." The width W1 may be, for example, 0.045 inch. Portions of the joining members 208A–208D on either sides of the grooves have a thickness "T2." The thickness T2 may be, for example, 0.030 inch. The joining members 208C–208D have widths "W2," and the joining members 208A–208B have widths "W3." The width W2 may be, for example, 0.500 inch. The width W3 may be, for example, 0.375 inch. A height "H1" exists between the surfaces of the joining members 208A–208D adapted for bonding to the skins and having the grooves for receiving and bonding to edges of ribs. The height H1 may be, for example, 0.100 inch. A height "H2" exists between the surfaces of the joining members 208A–208D adapted for bonding to the skins and bottoms of the grooves for receiving and bonding to the edges of the ribs in FIG. 1. The height H2 may be, for example, 0.190 inch.

FIG. 2A is a cross-sectional view of one embodiment of the joining member 208C of FIG. 1. In the embodiment of FIG. 2A, the joining member 208C has a surface 300 adapted for attaching to the upper skin 204 via an adhesive layer. The surface 300 extends along the longitudinal axis of the joining member 208C. The surface 300 may have two ridges 302 on opposite edges of the surface 300. The two ridges 302 extend along the longitudinal axis of the joining member 208C. Each ridge 302 has a height "H1" above the surface 300. The height H1 may be, for example, 0.008 inch. The surface 300 may be roughened to improve adhesion between the adhesive material and the surface 300.

Referring back to FIG. 1, in mechanically connecting the joining member 208C to the adjacent surface of the upper skin 204, an adhesive material is positioned between the surface 300 of the joining member 208C and the adjacent surface of the upper skin 204. Pressure is applied between the joining member 208C and the upper skin 204, causing the adhesive material to flow and spread across the surface 300 of the joining member 208C. The outermost surfaces (i.e., highest peaks) of the ridges 302 expectedly contact the adjacent surface of the upper skin 204. In this manner, the ridges 302 determine a bond-line thickness of the adhesive material between the surface 300 of the joining member 208C and the adjacent surface of the upper skin 204. While the ridges 302 are useful for controlling bond-line thickness when a paste adhesive is used, the ridges 302 are not required when a film adhesive with an integral carrier (not shown) is used, in which case the carrier provides bond-line thickness control.

The joining member 208C has a groove 304 in a surface of the joining member 208C opposite the surface 300. The groove 304 extends along the longitudinal axis of the joining member 208C, and is adapted for receiving the upper edge 214 of the rib 202B and for attaching to the upper edge 214 of the rib 202B via an adhesive layer. An inner surface of the groove 304 is adapted for attaching to the upper edge 214 of the rib 202B via the adhesive layer, and includes two opposed and substantially planar sidewall surfaces 306. One of two ridges 308 extends from each of the opposed sidewall surfaces 306. Each ridge 308 extends along the longitudinal axis of the joining member 208C and has a height "H2" above the corresponding substantially planar sidewall surface 306. The height H2 may be, for example, 0.008 inch. The inner surface of the groove 304, including the opposed sidewall surfaces 306, may be roughened to improve adhesion between the adhesive material and the inner surface.

Referring back to FIG. 1, in mechanically connecting the joining member 208C to the upper edge 214 of the rib 202B, an adhesive material is positioned within the groove 304 of the joining member 208C, and the upper edge 214 of the rib 202B is inserted into the groove 304. The outermost surfaces (i.e., highest peaks) of the ridges 308 expectedly contact side surfaces of the upper edge 214 of the rib 202B, thereby centering the rib 202B in the groove 304. As the upper edge 214 of the rib 202B is inserted into the groove 304, the adhesive material expectedly flows around the portion of the upper edge 214 of the rib 202B. The ridges 308 determine a bond-line thickness of the adhesive material between the opposed sidewall surfaces 306 of the inner surface of the groove 304 and the adjacent side surfaces of the upper edge 214 of the rib 202B.

FIG. 2B is a cross-sectional view of another embodiment of either the joining member 208C of FIG. 2. In the embodiment of FIG. 2B, the surface 300 of the joining member 208C includes a single ridge 310 at or near the centerline of the joining member 208C. The ridge 310 extends along the longitudinal axis of the joining member 208C and has a height "H1" above the surface 300. Referring back to FIG. 1, in mechanically connecting the joining member 208C to the adjacent surface of the upper skin 204, an adhesive material is positioned between the surface 300 of the joining member 208C and the adjacent surface of the upper skin 204. Pressure is applied between the joining member 208C and the upper skin 204, causing the adhesive material to flow and spread across the surface 300 of the joining member 208C. The outermost surface (i.e., highest peak) of the ridge 310 expectedly contacts the adjacent surface of the upper skin 204. In this manner, the ridge 310 determines a bond-line thickness of the adhesive material existing around the center of the surface 300 of the joining member 208C and the adjacent surface of the upper skin 204.

FIGS. 2C–2G are cross-sectional views of various alternative embodiments of the joining member 208C.

Figures 3A, 3B:
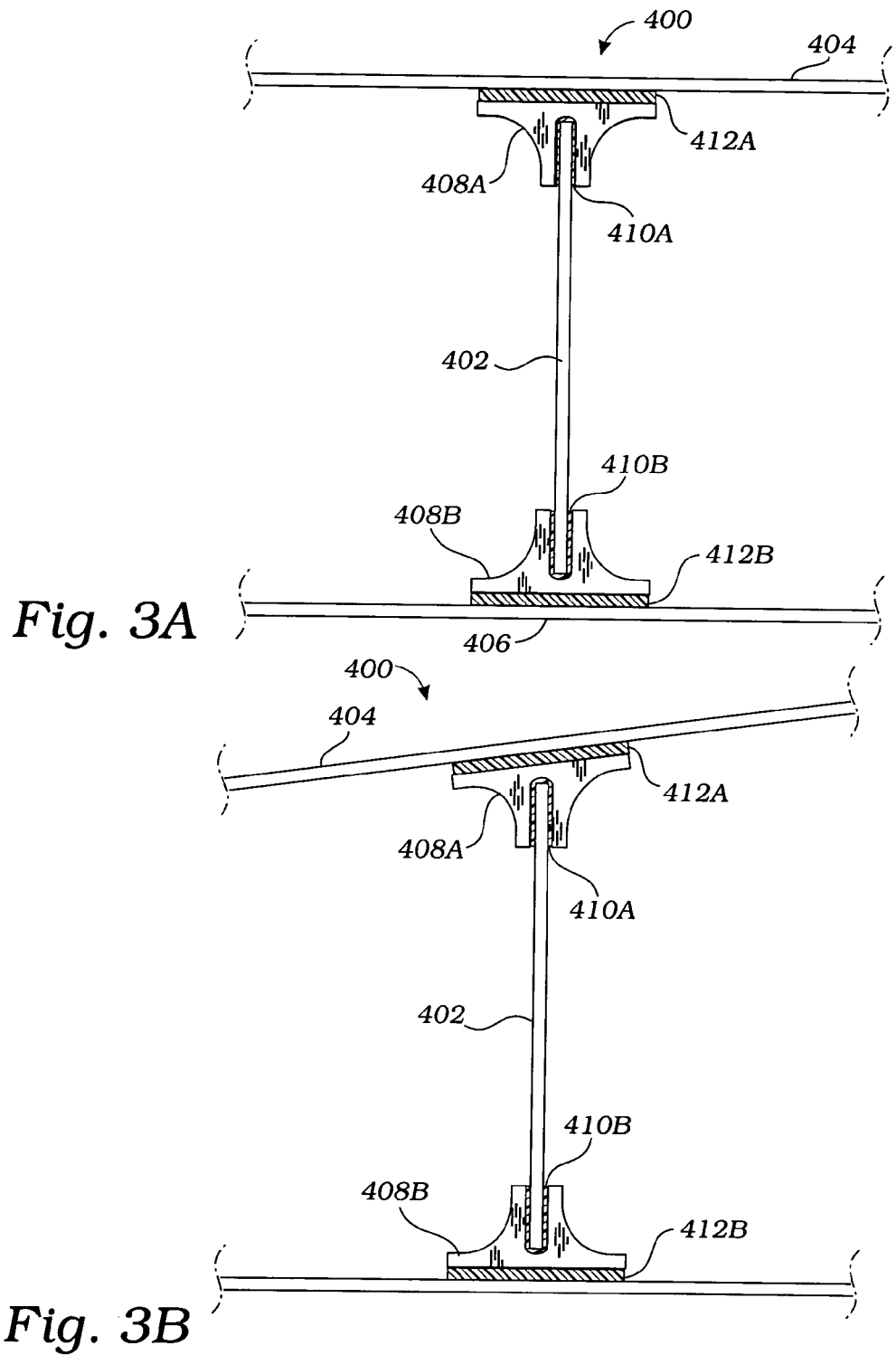
FIG. 3A is front elevational cross-sectional view of a section of one embodiment of the structural element once it has been assembled.
FIG. 3B is front elevational cross-sectional view of another section of the structural element wherein the upper and lower skins are not parallel to one another.

FIG. 3A is a cross-sectional view of a section 400 of one embodiment of the structural element. In the section 400, a rib 402 for supporting an upper skin 404 and a lower skin 406 is connected between the upper skin 404 and the lower skin 406. A joining member 408A connects an upper edge of the rib 402 to the adjacent surface of the upper skin 404, and a joining member 408B connects a lower edge of the rib 402 to the adjacent surface of the lower skin 406.

In the embodiment of FIG. 3A, the upper edge of the rib 402 extends into the groove in the joining member 408A, and an adhesive layer 410A mechanically connects the upper edge of the rib 402 to the joining member 408A (i.e., to the inner surface of the groove in the joining member 408A). Similarly, the lower edge of the rib 402 extends into the groove in the joining member 408B, and an adhesive layer 410B mechanically connects the lower edge of the rib 402 to the joining member 408B (i.e., to the inner surface of the groove in the joining member 408B).

In the embodiment of FIG. 3A, an adhesive layer 412A mechanically connects the surface of the joining member 408A opposite the groove to the adjacent surface of the upper skin 404. Similarly, an adhesive layer 412B mechanically connects the surface of the joining member 408B opposite the groove to the adjacent surface of the lower skin 406.

The adhesive materials used to form the adhesive layers 412A and 412B may be in paste or film form. Suitable adhesive materials include epoxy. Suitable paste epoxies include Hysol® EA934NA or EA9330 made by Loctite Aerospace (Bay Point, Calif.), and product number NB-101 made by Newport Adhesives and Composites (Irvine, Calif.). Suitable film epoxies include Hysol® EA9628 made by Loctite Aerospace. The adhesive layers 412A and 412B may be formed from the same adhesive material, or from different adhesive materials.

FIG. 3B is a cross-sectional view of the section 400 of the structure of FIG. 3A wherein the upper skin 404 and the lower skin 406 are not parallel to one another, and the joining member 408A is angled or canted to compensate.

Figure 4A:
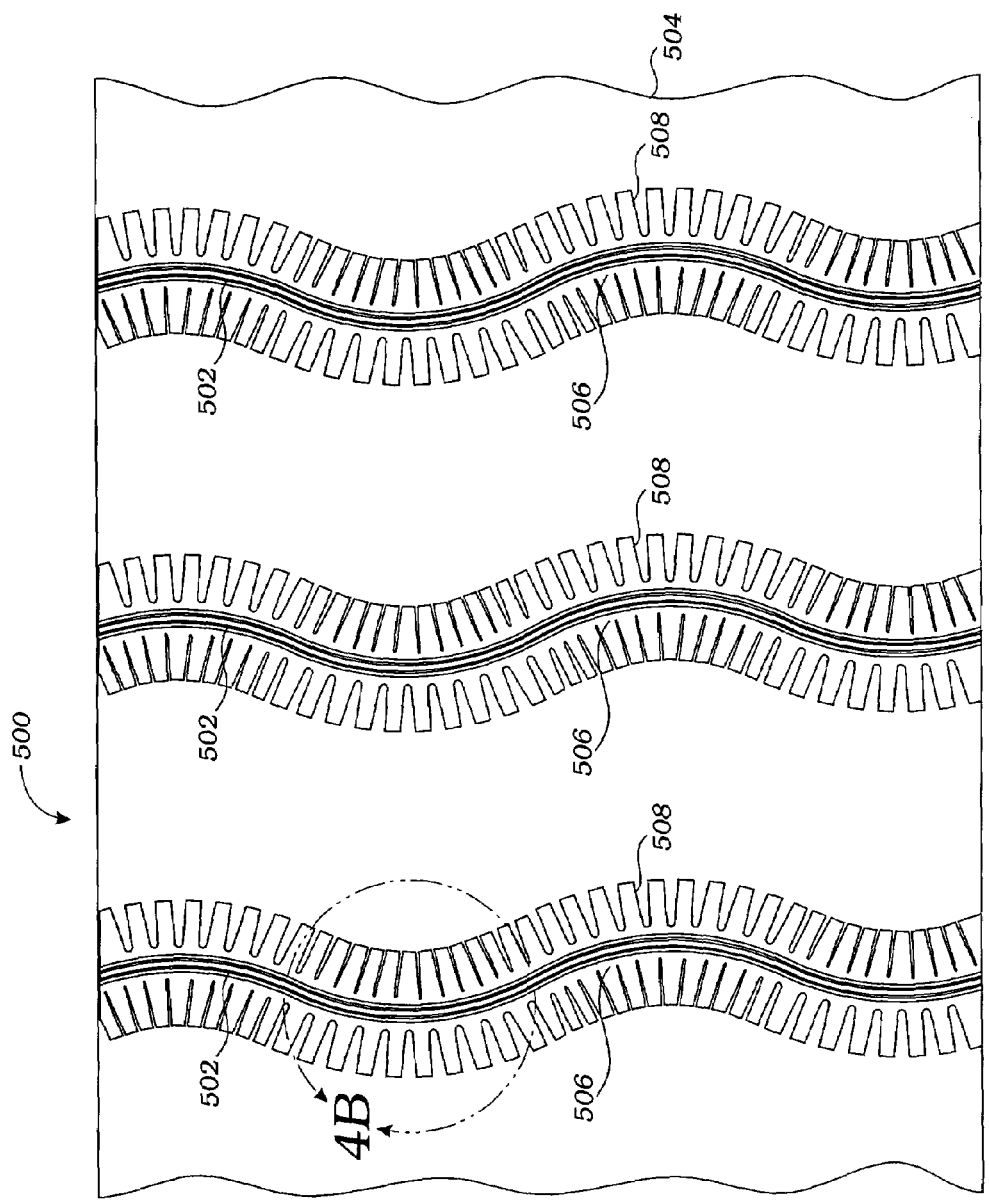
FIG. 4A is a plan view of a section of the airfoil wherein the ribs are connected to an upper skin by corresponding joining members that are serpentine rather than straight.
Figure 4B:
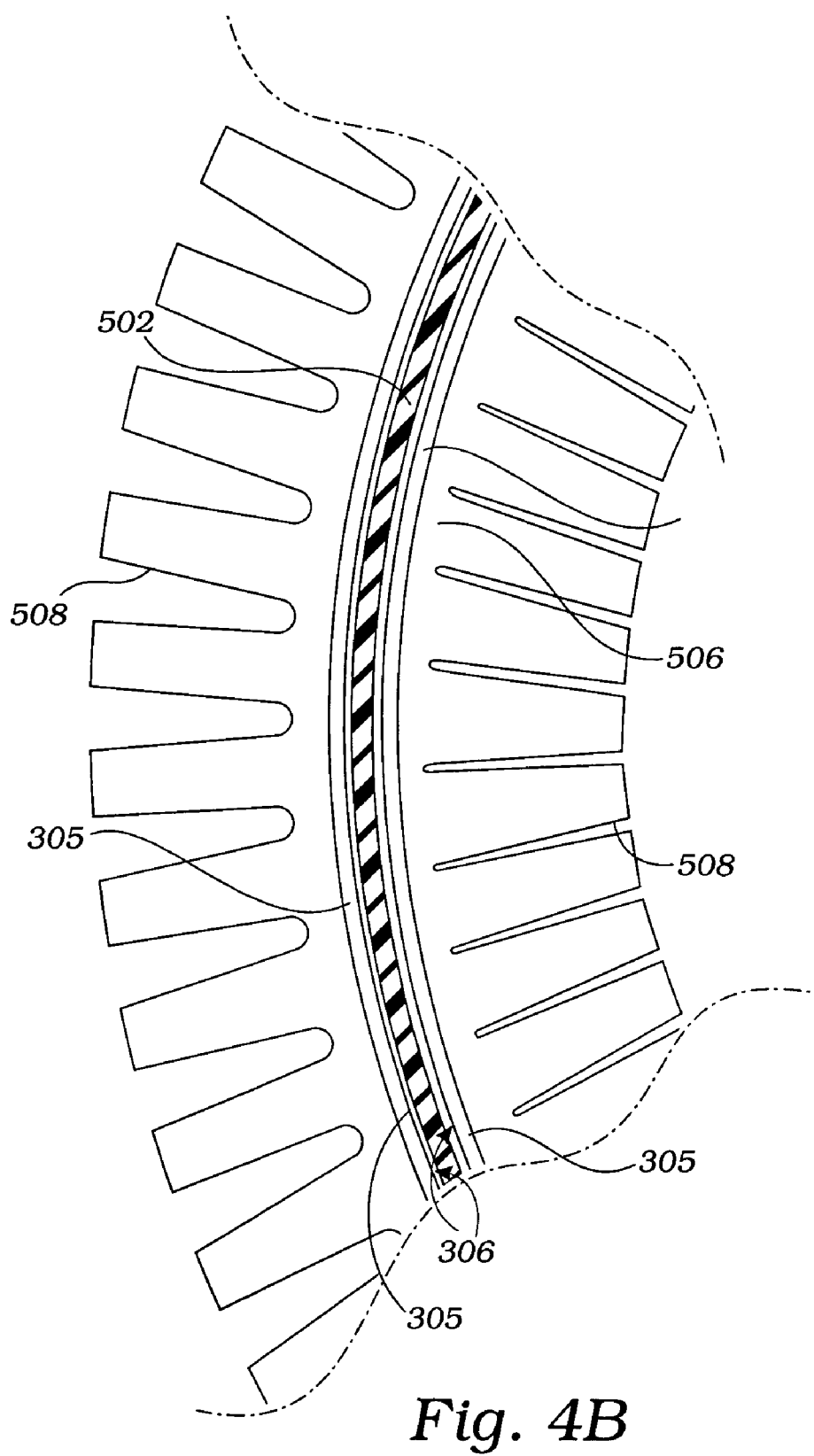
FIG. 4B is an exploded view of the ribs and the corresponding joining member of FIG. 4A, illustrating a series of notches on opposite side edges of the joining member that enable the joining member to be easily curved or bent.

FIG. 4A is a plan view of a section 500 of a structural element. In the embodiment of FIG. 4A, the rib 502 and the joining members 506 are serpentine rather than straight, each forming a generally "S" shape. The serpentine or "S"-shaped rib 502 and corresponding joining member 506 provides a "panel breaker" function, eliminating "oil canning" of the upper skin 504 in unsupported areas. FIG. 4B is an exploded view of the rib 502 and the corresponding joining member 506 of FIG. 4A. As indicated in FIG. 4B, the joining member 506 includes a series of notches 508 on opposite side edges. These notches 508 allow the rib 502 and the joining member 506 to be easily curved or bent, thereby taking on the serpentine or "S" shape shown in FIG. 4A. In this embodiment, the joining member 506 includes upwardly extending sidewalls 305 to form the groove 304 (as shown in FIG. 2A). As discussed above, in alternative embodiments the joining member 506 could be cut or milled to form the groove 304 shown in FIG. 2A.

Figure 5:
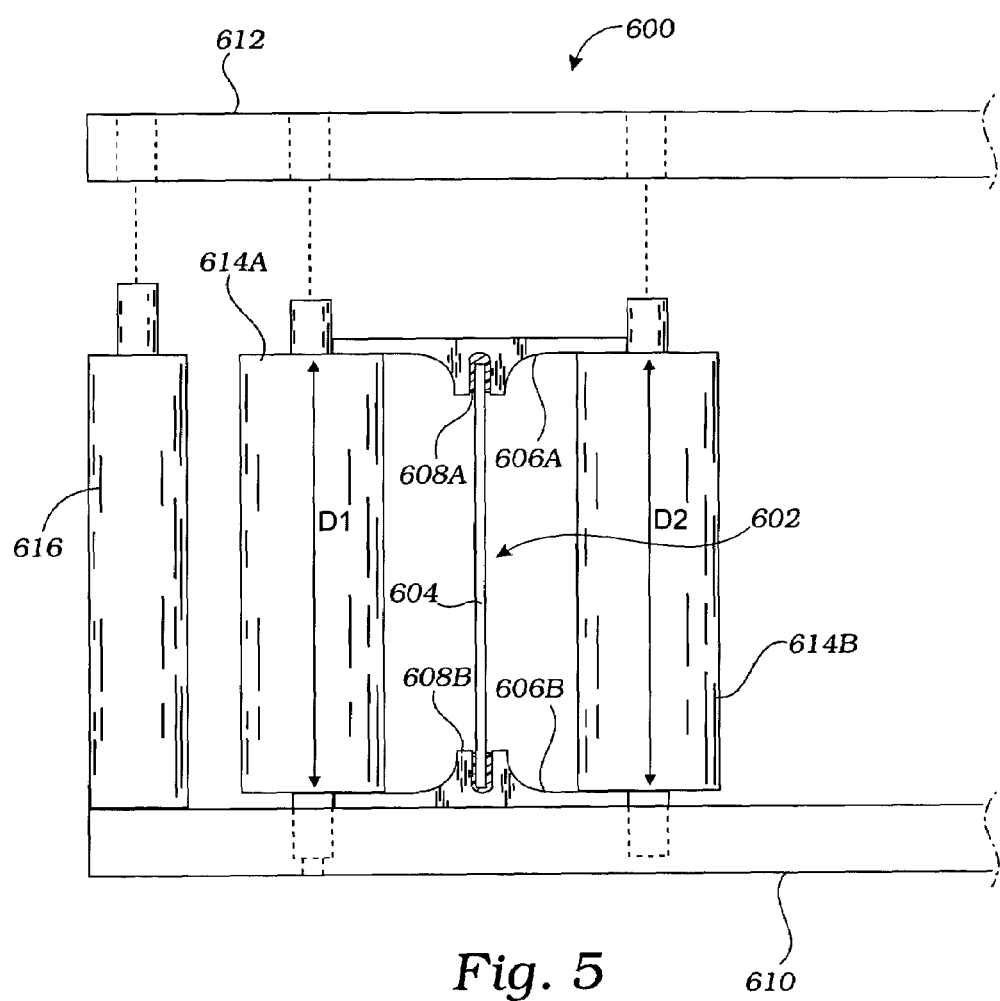
FIG. 5 is a side view of one embodiment of a rib subassembly fixture for assembling rib subassemblies.

FIG. 5 is a side view of one embodiment of a rib subassembly fixture 600 for assembling rib subassemblies. In FIG. 5, a rib subassembly 602 is shown in the subassembly fixture 600. The rib subassembly 602 includes a rib 604 having joining members 606A and 606B attached to opposite edges. The rib subassembly fixture 600 includes a base plate 610, a top plate 612, a pair of spacers 614A and 614B, and a stop post 616.

Figure 6A:
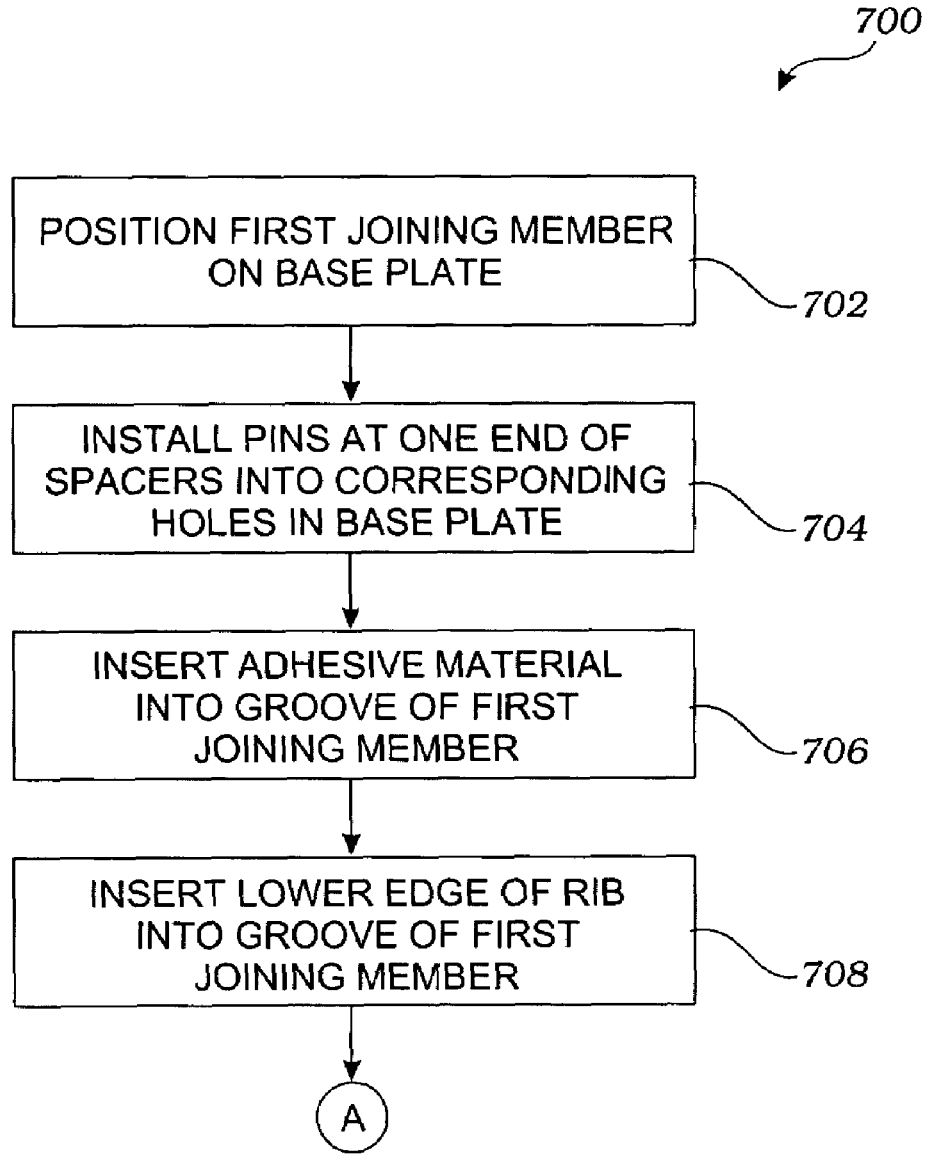
FIGS. 6A and 6B in combination form a flow chart of one embodiment of a method for forming the rib subassembly.
Figure 6B:
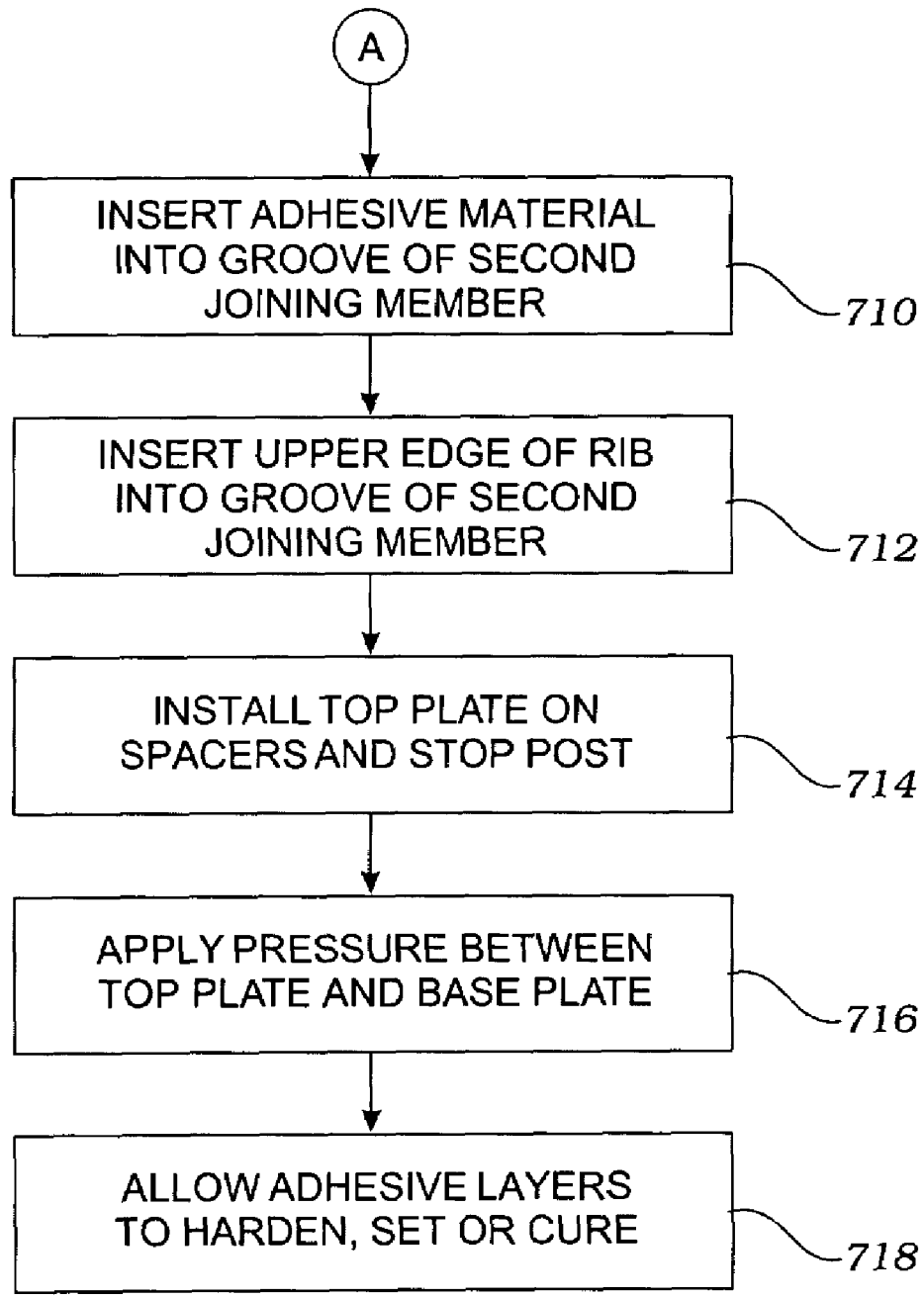

FIGS. 6A and 6B in combination form a flow chart of one embodiment of a method 700 for forming a rib subassembly for supporting the skin including a rib having joining members attached to opposite edges. The method 700 will now be described as being carried out via the rib subassembly fixture 600 to form the rib subassembly 602 of FIG. 5.

Referring to FIGS. 5 and 6 in combination, during a step 702 of the method 700, the joining member 606B is positioned on the base plate 610 as shown in FIG. 5. Pins at lower ends of the spacers 614A and 614B are inserted into corresponding holes in the base plate 610 during a step 704.

During a step 706, an adhesive material is inserted into the groove of the joining member 606B. A lower edge of the rib 604 is inserted into the groove during a step 708.

As described above and shown in FIGS. 2A and 2B, the inner surface of the groove of the joining member 606B may include two ridges on opposite sides of the inner surface. In this situation, the outermost surfaces (i.e., highest peaks) of the ridges expectedly contact side surfaces of the lower edge of the rib 604, thereby centering the rib 604 in the groove. As the lower edge of the rib 604 is inserted into the groove, the adhesive material expectedly flows around the portion of the lower edge of the rib 604, forming an adhesive layer 608B shown in FIG. 5. The ridges determine a bond-line thickness of the adhesive layer 608B between the inner surface of the groove and the adjacent side surfaces of the lower edge of the rib 604.

During a step 710, an adhesive material is inserted into the groove of the joining member 606A. An upper edge of the rib 604 is inserted into the groove during a step 712.

As described above and shown in FIGS. 2A and 2B, the inner surface of the groove of the joining member 606A may include two ridges on opposite sides of the inner surface. In this situation, the outermost surfaces (i.e., highest peaks) of the ridges expectedly contact side surfaces of the upper edge of the rib 604, thereby centering the rib 604 in the groove. As the upper edge of the rib 604 is inserted into the groove, the adhesive material expectedly flows around the portion of the upper edge of the rib 604, forming an adhesive layer 608A shown in FIG. 5. The ridges determine a bond-line thickness of the adhesive layer 608A between the inner surface of the groove and the adjacent side surfaces of the lower edge of the rib 604.

During a step 714, the top plate 612 of the rib subassembly fixture 600 is installed on the spacers 614A and 614B and the stop post 616 such that upper pins of the spacers 614A and 614B and a pin of the stop post 616 are inserted into corresponding holes in the top plate 612. Pressure is applied between the top plate 612 and the base plate 610 during a step 716 such that outer edges (i.e., shoulders) of the spacers 614A and 614B contact outer edges of both joining members 606A and 606B on opposite sides of the rib 604.

As indicated in FIG. 5, when the edges (i.e., shoulders) of the spacer 614A contacts the outer edges of both joining members 606A and 606B, the spacer 614A ensures a dimension "D1" exists between the outer edges of the joining members 606A and 606B on one side of the rib 604. Similarly, when the edges (i.e., shoulders) of the spacer 614B contacts the outer edges of both joining members 606A and 606B, the spacer 614B ensures a dimension "D2" exists between the outer edges of the joining members 606A and 606B on the other side of the rib 604. The dimensions D1 and D2 may or may not be equal.

During a step 718, the adhesive layers 608A and 608B are allowed to harden, set, or cure. Contact between outer surfaces of the upper pins of the spacers 614A and 614B and the pin of the stop post 616 and the inside surfaces of the corresponding holes in the top plate 612 tend to keep the top plate 612 in position during the step 718.

Figure 7:
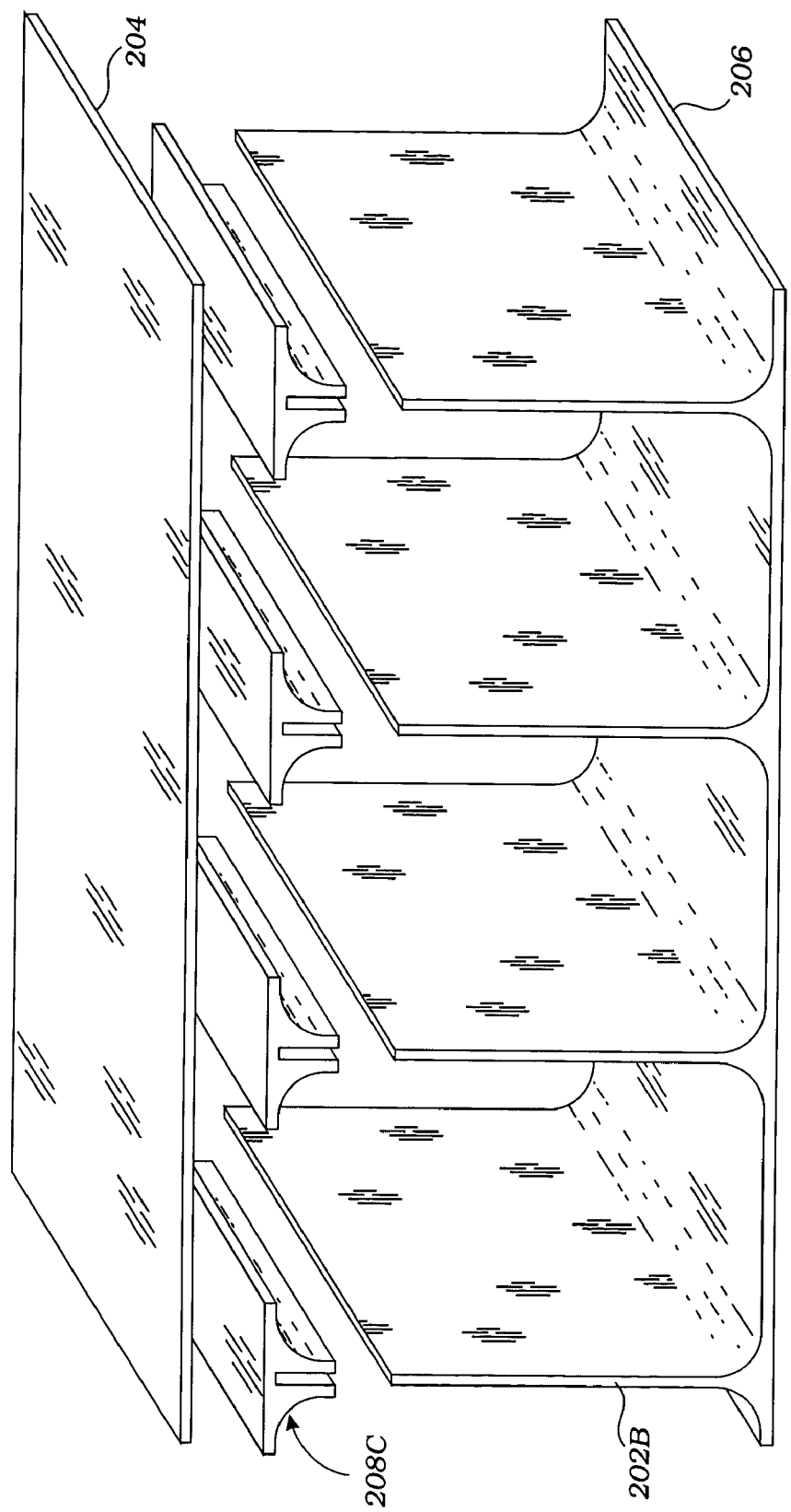
FIG. 7 is a perspective view of an alternative embodiment of the structural element wherein the bottom skin is integrally joined with the ribs to form a monolithic base with integral ribs.

FIG. 7 is a perspective view of an alternative embodiment of the structural element wherein the bottom skin 206 is integrally joined with the ribs 202B to form a monolithic base with integral ribs. The ribs 202B are attached to the top skin 204 with the clips 208C, as described above. Various alternative uses of the clips 208C may be devised by those skilled in the art, and should be considered within the scope of the present invention as claimed.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. A structure for supporting two opposed skins, the structure comprising:
   a rib having a pair of opposed outer edges;
   a pair of joining members, each comprising:
      a first surface adapted for bonding to a surface of one of the skins via an adhesive layer, wherein the first surface comprises at least one ridge extending therefrom for determining a bond-line thickness of the adhesive layer;
      a second surface opposite the first surface and comprising a groove having an inner surface adapted for receiving and bonding to an outer edge of the rib via another adhesive layer;
   wherein one of the outer edges of the rib extends into the groove of a corresponding one of the pair of joining members and is bonded to the corresponding joining member via a first adhesive layer formed in the groove of the corresponding joining member; and
   wherein the other outer edge of the rib extends into the groove of the other joining member and is bonded to the other joining member via a second adhesive layer formed in the groove of the other joining member.

2. The structure as recited in claim 1, wherein a bond-line thickness of the first adhesive layer is determined by a pair of ridges extending outward from substantially planar sidewall surfaces of the groove of the corresponding joining member.

3. The structure as recited in claim 1, wherein a bond-line thickness of the second adhesive layer is determined by a pair of ridges extending outward from substantially planar sidewall surfaces of the groove of the other joining member.

4. The structure as recited in claim 1, wherein the first and second adhesive layers comprise epoxy adhesive materials.

* * * * *